United States Patent
Fuchs et al.

(10) Patent No.: US 8,947,037 B2
(45) Date of Patent: Feb. 3, 2015

(54) METHOD FOR ESTIMATING A TORQUE OF A THREE-PHASE DRIVE MOTOR FOR A VEHICLE

(75) Inventors: Enrico Fuchs, Reinsdorf (DE); Thomas Götze, Chemnitz (DE); Steffen Hellmich, Nanjing (CN); Hans-Georg Köpken, Erlangen (DE); Stefan Völkel, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 194 days.

(21) Appl. No.: 13/542,992

(22) Filed: Jul. 6, 2012

(65) Prior Publication Data

US 2013/0175965 A1 Jul. 11, 2013

(30) Foreign Application Priority Data

Jul. 8, 2011 (EP) .................................... 11173249

(51) Int. Cl.
| | | |
|---|---|---|
| G05F 1/10 | (2006.01) | |
| H02K 11/00 | (2006.01) | |
| G01L 3/00 | (2006.01) | |
| G05D 17/02 | (2006.01) | |
| H02P 23/14 | (2006.01) | |

(52) U.S. Cl.
CPC ............. *H02K 11/0042* (2013.01); *G01L 3/00* (2013.01); *G05D 17/02* (2013.01); *H02P 23/14* (2013.01); *H02P 2205/05* (2013.01)
USPC ............. 318/650; 318/490; 318/807; 318/71; 702/145; 702/182

(58) Field of Classification Search
USPC .......... 318/490, 400.03, 400.04, 400.02, 727, 318/798, 799, 801, 803, 804, 805, 806, 807, 318/808, 809, 461, 812, 813; 324/141, 142, 324/658; 317/11, 15; 363/44, 98, 56.02; 702/65, 145, 182
See application file for complete search history.

(56) References Cited

U.S. PATENT DOCUMENTS

| | | | | |
|---|---|---|---|---|
| 4,616,179 | A | * 10/1986 | Braun | ....................... 324/765.01 |
| 5,673,196 | A | * 9/1997 | Hoffman et al. | ................. 702/65 |
| 5,828,199 | A | * 10/1998 | Tajima et al. | ................... 318/779 |
| 6,373,415 | B1 | * 4/2002 | King et al. | ..................... 341/118 |
| 6,505,132 | B1 | * 1/2003 | Takaku | .......................... 702/65 |
| 8,010,318 | B2 | * 8/2011 | Lu et al. | ........................ 702/182 |
| 2004/0134267 | A1 | 7/2004 | Boesch | |
| 2006/0038530 | A1 | * 2/2006 | Holling | .......................... 318/807 |
| 2008/0300827 | A1 | 12/2008 | Habetler et al. | |

FOREIGN PATENT DOCUMENTS

| | | |
|---|---|---|
| GB | 2 440 559 A | 2/2008 |
| GB | 2440559 B | * 2/2009 |

* cited by examiner

*Primary Examiner* — Kawing Chan
*Assistant Examiner* — Jorge L Carrasquillo
(74) *Attorney, Agent, or Firm* — Henry M. Feiereisen LLC

(57) ABSTRACT

A method for estimating a torque of a three-phase motor for a vehicle includes measuring a respective current strength in at least two of three phase lines, wherein the three-phase motor is supplied with power by a converter, and wherein the three phase lines lead from the converter to the three-phase motor of the vehicle, measuring a respective voltage at each of the three phase lines, determining a rotating field frequency as a function of the measured current strengths or the measured voltages; and determining an estimated value for the torque as a function of the measured current strengths, the measured voltages and the determined rotating field frequency.

7 Claims, 2 Drawing Sheets

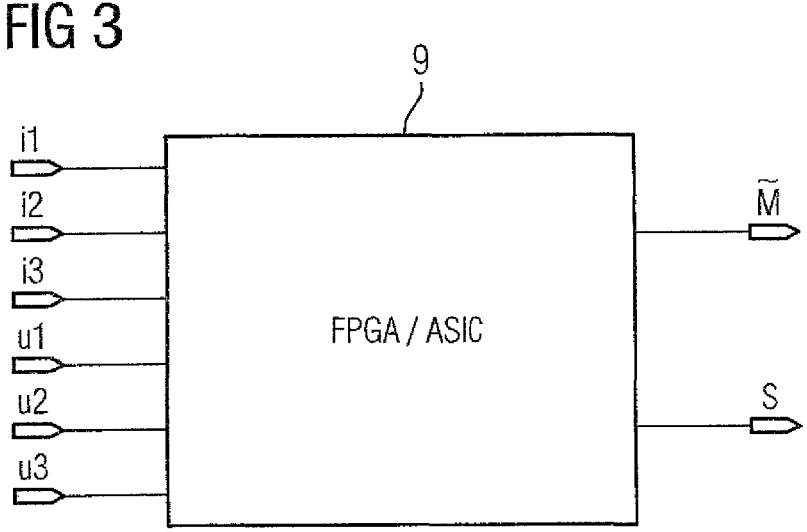

METHOD FOR ESTIMATING A TORQUE OF A THREE-PHASE DRIVE MOTOR FOR A VEHICLE

CROSS-REFERENCES TO RELATED APPLICATIONS

This application claims the priority of European Patent Application, Serial No. EP11173249, filed Aug. 7, 2011, pursuant to 35 U.S.C. 119(a)-(d), the disclosure of which is incorporated herein by reference.

BACKGROUND OF THE INVENTION

The present invention relates to a method for estimating a torque of a three-phase driver motor for a vehicle, which is supplied with power by a converter, with three phase lines leading from the converter to the drive motor. Additionally the present invention relates to a corresponding drive device for a vehicle.

The following discussion of related art is provided to assist the reader in understanding the advantages of the invention, and is not to be construed as an admission that this related art is prior art to this invention.

In electrical traction drives (e.g. in the case of an electric car) it must be ensured, in order to safeguard track stability, that the target torque defined by a vehicle controller is largely correctly converted as an actual torque on the wheel. By comparing target and actual values it is possible to infer that the drive is working free from errors and consequently that track stability is being complied with. Determining the torque is thus an important safety feature. The actual torque should therefore be determined using operational equipment (a torque monitor) which is independent of the control branch in which target values are supplied by control electronics.

Whereas the target value of the torque is known (directly available from the control algorithms of a vehicle controller), the actual torque can only be directly measured with considerable effort. Standard commercial torque measuring shafts cannot be used in a vehicle for reasons of space, weight and cost. Therefore instead of a torque measurement it is necessary to use estimation or calculation methods based on variables that can be measured more easily.

Three-phase motors or alternating current motors are typically used for the electrical drive of vehicles. Such an alternating current motor is normally controlled by an intermediate circuit via a converter (see FIG. 1). The converter is controlled by control electronics or a controller.

As long as the converter is pulsing and the controller is working, it is possible to use the actual current values and the target voltage values to calculate the torque. A precondition for this is that the target voltage values are converted tolerably correctly into actual values.

The instantaneous power of the converter can be determined from voltages and currents. A suitable filter can be used to obtain the power component which is largely converted into mechanical power in the motor (the stator and rotor losses must be deducted). This power P then corresponds to the torque M multiplied by the angular velocity $2\pi \cdot n_{mech}$ as per the formula:

$$M \approx \frac{P}{2\pi \cdot n_{mech}}$$

The mechanical torque can in principle also be estimated in accordance with the following formula:

$$\tilde{M} \approx \frac{P_\delta}{2\pi \cdot f}$$

It is simpler to obtain the torque using this second equation, since the rotor power input Pδ can be determined more easily (average active power of the converter less the stator losses). Instead of the mechanical speed $n_{mech}$ the electrical output frequency f of the converter can be used. This is always present as a target value in the controller.

The motor losses (stator and rotors) can likewise be derived from the measured variables using corresponding models. The energy component in the stator inductances of the motor can thus be taken into account.

Compensation for an output voltage deviation in the case of a power converter is known from the publication GB 2 440 559 B. In this case an integrated voltage measurement of the three output voltages is performed. This is done with a Σ-Δ AD converter.

It would be desirable and advantageous to provide an improved method for estimating the torque of a drive of a vehicle more reliably

SUMMARY OF THE INVENTION

According to one aspect of the present invention a method for estimating a torque of a three-phase drive motor for a vehicle, supplied with power by a converter, with three phase lines leading from the converter to the drive motor, includes the steps of measuring a current strength in each case in at least a first and a second of the three phase lines, measuring a voltage in each case at the three phase lines, determining a rotating field frequency from the measured current strengths or the measured voltages and determining an estimated value for the torque from the measured current strengths, the measured voltages and the determined rotating field frequency.

According to another aspect of the present invention a drive device for a vehicle with a three-phase drive motor supplied with power by a converter, and three phase lines from the converter to the drive motor, via which the drive motor is supplied with power includes a current measuring unit for measuring a current strength in each case in at least two of the phase lines, a voltage measuring unit for measuring a voltage in each case at the three phase lines, a calculation unit for determining a rotating field frequency from the measured current strengths or the measured voltages and an estimation unit for determining an estimated value for the torque from the measured current strengths, the measured voltages and the determined rotating field frequency.

Advantageously the torque of the drive motor is therefore determined not from actual current strengths and target voltages, but from actual current strengths and actual voltages at the converter output. This significantly improves the estimation of torque and estimates are also possible if the converter is locked.

In a preferred embodiment the voltages at the three phase lines are measured using a Σ-Δ method. Likewise the currents in the three phase lines can be measured using a Σ-Δ method. Such measurement methods are reliable and can be implemented using simple means.

Preferably a power value is calculated for determining the estimated value as a total of a first and of a second partial power value, with the first partial power value corresponding to the product of the current strength in the first phase line and to a first line-to-line voltage between the first phase line and a third of the three phase lines, and with the second partial power value corresponding to the product of the current strength in the second phase line and to a second line-to-line voltage between the second phase line and the third phase line. In this way the power value can be determined from just five values of the three-phase system.

The power value obtained from the actual currents and actual voltages represents an instantaneous power and can be low-pass filtered in order to obtain an average electrical active power of the converter. This provides a meaningful basis for estimating the torque.

Additionally a power loss model for losses in the drive motor can be provided, with a power loss obtained using the power loss model being subtracted from the average electrical active power of the converter to determine a rotating field power from which the torque is estimated. The power loss model can be used to adjust the losses in the stator and rotor of the motor very realistically, so that the actual output power of the motor can be better estimated.

Furthermore, the torque can be estimated even if the converter is locked. This has the advantage that the torque can be estimated even if converter and motor are not in the normal operating mode.

Furthermore, the measured voltages can be verified in a switch-on sequence in which the converter is controlled such that the same voltage is applied in all three phase lines, so that the current strengths measured in the phase lines are each zero. This verification ensures that the voltages are measured correctly.

Additionally the measured two current strengths can be verified by measuring a third current strength in the third phase line, the total of the current strengths coming to zero. In this way the current strength measurement can also be unambiguously checked.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a signal flow diagram for calculating the torque from two currents and three measured voltages and FIG. 3 shows the processing of the measured variables in a computing unit.

DETAILED DESCRIPTION OF PREFERRED EMBODIMENTS

Figure 1:
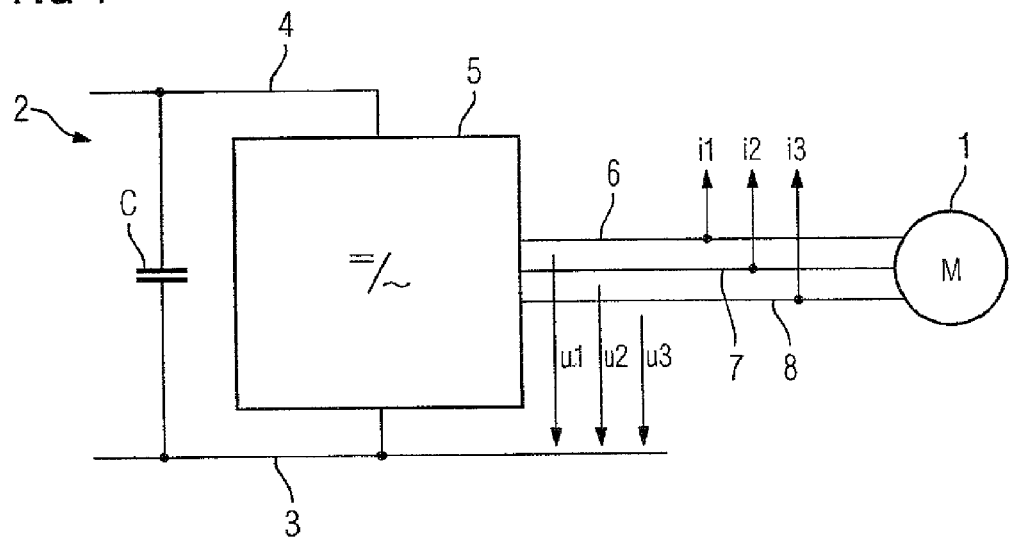
FIG. 1 shows a converter with motor and identification of the measured variables.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a drive device for an electrically operated vehicle. The drive apparatus possesses a motor 1, which is designed as an alternating current motor. The motor 1 is supplied with power by an intermediate circuit 2 which is indicated by an intermediate circuit capacitor C. The intermediate circuit 2 is a direct voltage system with a negative rail 3 and a positive rail 4. A converter 5 linked to the negative rail 3 and the positive rail 4 converts a direct current from the intermediate circuit 2 into a three-phase current or alternating current for the motor 1. Three phase lines are laid from the converter 5 to the motor 1 for this purpose: a first phase line 6, a second phase line 7 and a third phase line 8. A current i1 is measured in the first phase line 6, a current i2 in the second phase line 7 and a current i3 in the third phase line 8. A voltage u1 is present vis-à-vis the negative rail 3 at the first phase line 6, a voltage u2 at the second phase line 7 and a voltage u3 at the third phase line 8.

Normally the motor currents i1, i2 and i3 of the motor 1 are measured directly. The currents are at least measured in two phases, and the current in the third phase is calculated from these, as the three currents together come to zero, as long as no isolation errors are present.

A method is known from the publication GB 2 440 559 B mentioned in the introduction, to which explicit reference is made here, for how using a $\Sigma$-$\Delta$ method (sigma-delta method) the output voltages u1, u2 and u3 of the converter 5 can be measured vis-à-vis the negative rail 3 of the intermediate voltage circuit. Thanks to the $\Sigma$-$\Delta$ method all measured values are present in digital form as $\Sigma$-$\Delta$ data flows and can be suitably further processed in a central logic module 9 (e.g. FPGA) (see FIG. 3).

Using the instantaneous values of the output voltages u1, u2 and u3 and the instantaneous values of the output currents i1, i2 and i3 the torque M emitted by the motor 1 can be calculated in the calculation unit 9, even if the converter 5 is locked or the target voltages cannot be correctly converted for other reasons (e.g. voltage-time integral errors as a result of dead time influences and forward voltage drops or as a result of reaching the control limit, activating minimum pulse monitoring). In these cases no target voltages are available or the target voltages differ from the actual voltages due to non-linearities. Then it is only possible to estimate the torque meaningfully on the basis of the actual voltages.

Figure 2:
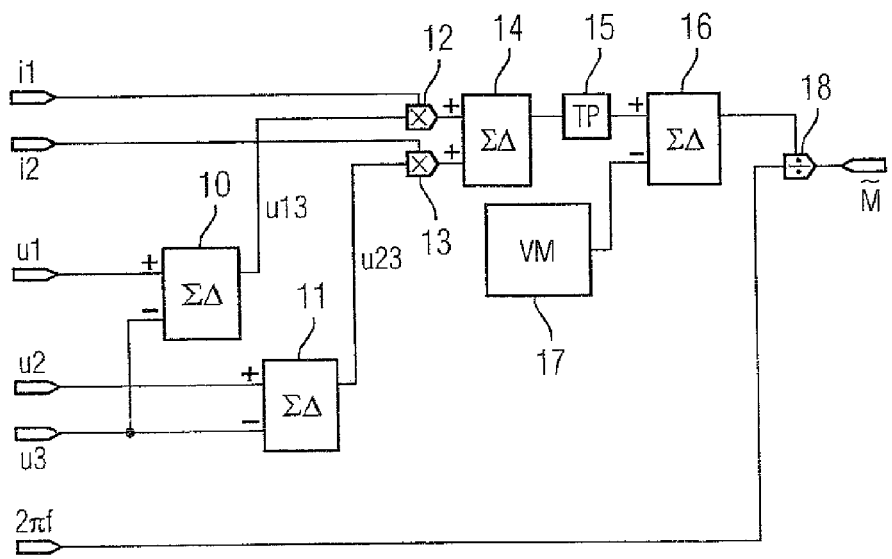

FIG. 2 shows by way of example based on a signal flow chart the calculation of the instantaneous line from the currents i1, i2 and the line-to-line voltages u13 and u23. In the specific example the currents i1 and i2 are thus measured in the first phase line 6 and the second phase line 7. Likewise the voltages u1, u2 and u3 are measured at the first phase line 6, the second phase line 7 and the third phase line 8 and are provided as input variables. The electrical output frequency f can be determined from the currents or voltages and a corresponding angular velocity $2\pi f$ can be provided.

Using a first subtractor 10 a first line-to-line voltage u13 is obtained by subtracting the third voltage u3 from the first voltage u1. Similarly, a second line-to-line voltage u23 is obtained using a second subtractor 11 by subtracting the third voltage u3 from the second voltage u2. The line-to-line voltage u13 is multiplied by the current i1 of the first phase line 6 in a multiplier 12. Likewise the line-to-line voltage u23 is multiplied in a multiplier 13 by the current 12 in the second phase line 7. The products of both multipliers 12 and 13 are summed in an adder 14, and the result represents the instantaneous power that is made available by the converter. Using a downstream low-pass filter 15 the electrical active power of the converter 5 is determined from the instantaneous power. The losses of the electric motor (especially the stator losses) are subtracted from this active power in a subtractor 16. These losses are provided using a power loss model 17. The output signal of the subtractor 16 thus corresponds to the actual rotating field power of the motor. Using a divider 18, with which the rotating field power is divided by the angular velocity $2\pi f$ of the converter, an estimated value $\tilde{M}$ of the actual mechanical torque M of the motor is finally obtained.

The measured variables used for the estimation are thus made available independently of the control branch with which target values for the converter are provided by the control electronics. For safety reasons it should be possible to check the measured variables for plausibility. The comparison with the target torque can then be effected both in the torque monitor and in the control unit, and a two-channel switch-off into safe mode can be initiated.

The voltage measurements can be checked in a switch-on sequence. In this case the converter can for example be controlled by the control electronics with a null pointer (000, 111), so that no line-to-line voltages u13, u23 are generated. In this case the null pointer 000 means for example that all phase lines 6, 7, 8 are short-circuited with the negative rail 3, whereas in the case of the null pointer 111 all phase lines 6, 7 and 8 are connected to the positive rail 4. If no line-to-line voltages are now generated, no current will flow either, but the voltage measurement channels are controlled. It must be possible to identify this at the voltage measurement elements.

It should also be possible to verify the measurement of the currents. This is simple to do, in that all three currents i1, i2 and i3 are measured. Only in error-free operation is the summated current zero. Otherwise a measurement or isolation error is present.

The rotating field frequency (frequency f of the rotating field) is also simple to check. The rotating field frequency can in fact be calculated both from the measured currents i1, i2, i3 as well as from the measured voltages u1, u2, u3, in that for example the temporal derivation of the angle is determined from the respective space vectors of the measured variables.

An excessive deviation identified using the method outlined above between target and actual value or the overshoot of a maximum limit for the estimated torque value can be used in the calculation unit 9 for initiating further protection measures. A corresponding signal s to trigger a protection reaction can be provided by the calculation unit 9 (see FIG. 3). For example, a permanent-magnet-excited synchro-machine can be short-circuited in field weakening mode to achieve a torque-free wheel, or can be isolated from the converter.

Advantageously in accordance with the above principle a $\Sigma$-$\Delta$ output voltage measurement can thus be used to calculate the developed actual torque. The comparison to be performed very quickly in the calculation unit 9 (e.g. logic module FPGA) with the target torque or with limit values that can be fixed can be used to respond very quickly to errors. This method works without software, resulting in a fast and reliable response, even if the software or controller exhibits a malfunction. Determining speed via the electric frequency also makes it independent of the rotary transducer. In this way a very high level of safety can be achieved.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for estimating a torque of a three-phase motor for a vehicle comprising the steps of:
measuring a respective current strength in at least a first one and a second one of three phase lines, wherein the three phase motor is supplied with power by a converter, and wherein the three phase lines lead from the converter to the three-phase motor of the vehicle;
measuring a respective voltage at each of the three phase lines;
determining a rotating field frequency as a function of the measured current strengths or the measured voltages;
determining an estimated value for the torque as a function of the measured current strengths, the measured voltages and the determined rotating field frequency, said determining comprising calculating a power value as a sum of a first and of a second partial power value, wherein the first partial power value corresponds to the product of the current strength in the first phase line and a first line-to-line voltage between the first phase line and a third one of the three phase lines, and wherein the second partial power value corresponds to the product of the current strength in the second phase line and a second line-to line voltage between the second phase line and the third phase line;
filtering the power value by using a low-pass filter for obtaining an average electrical active power of the converter;
providing a power loss model for losses in a drive motor;
obtaining a power loss with the power loss model;
determining a rotating, field power by subtracting the power loss from the average electrical active power of the converter; and
estimating the torque as a function of the rotating field power.

2. The method of claim 1, wherein the respective voltage is measured by using a $\Sigma$-$\Delta$ method.

3. The method of claim 1, wherein the respective current is measured by using a $\Sigma$-$\Delta$ method.

4. The method of claim 1, wherein the torque is estimated even if the converter is locked.

5. The method of claim 1, further comprising verifying the measured voltages by controlling the converter such that a same voltage is applied in each of the three phase lines, so that the current strength measured in each of the three phase lines is zero and no line-to-line voltages are generated.

6. The method of claim 1, further comprising verifying the first and second current strengths by measuring a third current strength in a third one of the three phase lines, wherein the first and second current strengths are verified when the sum of the measured first, second and third current strengths is zero.

7. A drive apparatus for a vehicle comprising:
a converter;
a three-phase drive motor;
three phase lines, each said phase lines leading from the converter to the drive motor, and supplying said drive motor with power,
a current measuring unit for measuring a respective current strength in at least two of the three phase lines;
a voltage measuring unit for measuring a respective voltage at each of the three phase lines;
a calculation unit for determining a rotating field frequency as a function of the respective current strengths measured by the current measuring unit or the respective voltages measured by the voltage measuring unit;
an estimation unit for determining an estimated value for a torque as a function of the respective measured current strengths, the respective measured voltages and the determined rotating field frequency by calculating a power value as a sum of a first and of a second partial power value, wherein the first partial power value corresponds to the product of the current strength in the first phase line and a first line-to-line voltage between the first phase line and a third one of the three phase lines, and wherein the second partial power value corresponds to the product of the current strength in the second phase line and a second line-to line voltage between the second phase line and the third phase line;

a low-pass filter configured to filter the power value for obtaining an average electrical active power of the converter; and a power loss model configured to determine a power loss in a drive motor;

wherein a rotating field power is determined by subtracting the power loss from the average electrical active power of the converter and the torque is estimated as a function of the rotating field power.

* * * * *